(12) United States Patent
Kusano

(10) Patent No.: US 7,994,470 B2
(45) Date of Patent: Aug. 9, 2011

(54) PHOTOELECTRIC ENCODER

(75) Inventor: Kouhei Kusano, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/461,371

(22) Filed: Aug. 10, 2009

(65) Prior Publication Data

US 2010/0044551 A1 Feb. 25, 2010

(30) Foreign Application Priority Data

Aug. 20, 2008 (JP) ................................ 2008-211797

(51) Int. Cl.
*G01D 5/34* (2006.01)
*H03M 1/00* (2006.01)
*H03M 1/22* (2006.01)

(52) U.S. Cl. ......... 250/231.13; 250/231.18; 250/231.14; 250/231.16; 341/110; 341/11

(58) Field of Classification Search .................. 250/231.13–231.18; 341/11, 13, 341/31, 3, 102, 103, 110, 142, 162; 356/616–617

See application file for complete search history.

(56) References Cited

U.S. PATENT DOCUMENTS

| 4,524,347 A | * | 6/1985 | Rogers ............................. 341/3 |
| 4,720,699 A | * | 1/1988 | Smith ............................. 341/13 |
| 5,021,650 A | * | 6/1991 | Rieder et al. ............. 250/231.16 |
| 5,889,280 A | * | 3/1999 | Matsuura .................. 250/237 G |

FOREIGN PATENT DOCUMENTS

JP       A-64-57120       3/1989

* cited by examiner

*Primary Examiner* — Georgia Y Epps
*Assistant Examiner* — Don Williams
(74) *Attorney, Agent, or Firm* — Oliff & Berridge, PLC

(57) ABSTRACT

The present invention relates to a photoelectric encoder including a scale having a grating (incremental pattern) of a predetermined pitch formed thereon and a light source (light-emitting element) and a light-receiving unit, which are relatively displaceable with respect to the scale, wherein light-receiving elements of the light-receiving unit output bright and dark signals of "N" phases, and the phases are detected by fitting a sinusoidal wave function having a fixed period to the bright and dark signals of "N" phases, thereby reducing a position detection error resulting from stains on the scale and/or defects of the grating.

10 Claims, 11 Drawing Sheets

Fig. 11
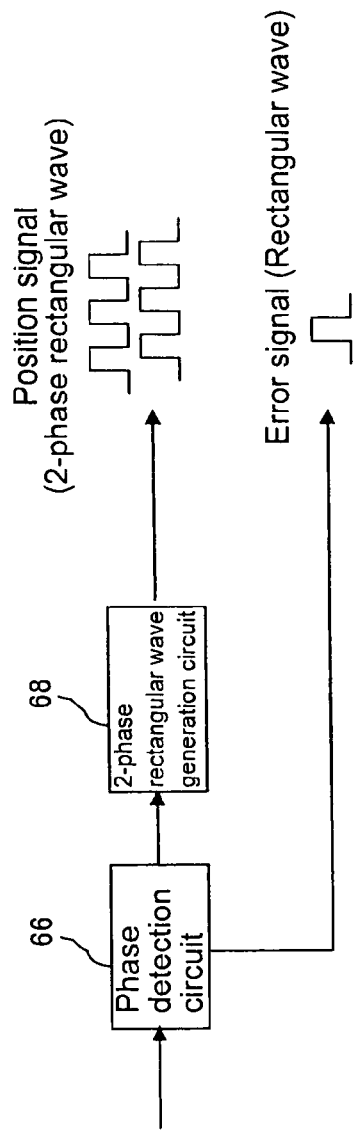
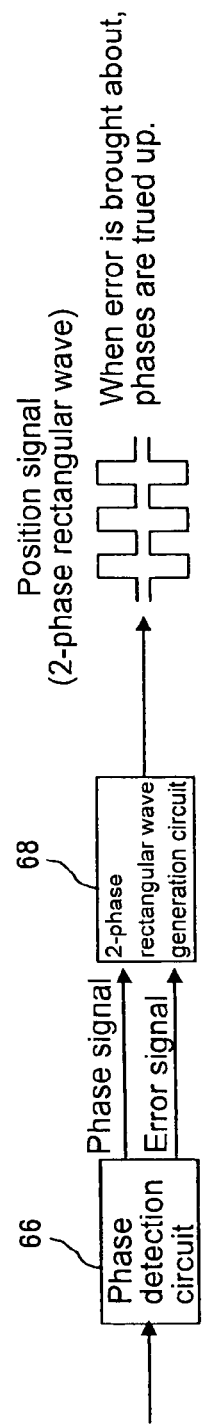
(A) Where error signal is output
(B) Where error signal is expressed by 2-phase rectangular wave Where light-receiving element pitch Pd is coarse with respect to scale pitch Ps, aliasing is brought about, and period is detected as being different from Ps.

Since, in present invention, detection is executed with fixed period, no aliasing is brought about, and phase is normally detected.

PHOTOELECTRIC ENCODER

CROSS-REFERENCE TO RELATED APPLICATION

The disclosure of Japanese Patent Application No. 2008-211797 filed on Aug. 20, 2008 including specifications, drawings and claims is incorporated herein by reference in its entirety.

BACKGROUND OF THE INVENTION

1. Field of the Invention

The present invention relates to a photoelectric encoder provided with a scale having a grating of a predetermined pitch formed thereon and a light source and a light receiving unit, which are relatively displaceable with respect to the scale, and in particular to a photoelectric encoder that is favorable in use of a linear encoder and is capable of reducing a position detection error resulting from stains on the scale and/or defects of the grating.

2. Description of the Related Art

Conventionally, a photoelectric encoder has been adopted for precise measurement of the amount of linear movement of a substance. As one of the position detecting methods in which an optical encoder is adopted, an arctangent calculation of Lissajous signals obtained from a photodiode array has been frequently used.

For example, in the method proposed in Japanese Published Unexamined Patent Application No. Sho64-57120 (hereinafter called Patent Document 1), as shown in FIGS. 1 and 2 thereof, a light-receiving element composed of a P-type semiconductor layer 34 forming a photosensitive zone 35 is first arranged in an array state at a disposing pitch by which a phase difference is brought about with respect to the phase of the optical grating 12 of the scale 13. Next, Lissajous signals are generated by differentially amplifying the output signals of the light-receiving element by differential amplifiers 38A and 38B, and further, the position is detected by carrying out an arctangent calculation with respect to the Lissajous signals.

However, as shown in FIG. 1 of the present application, where stains are adhered to the scale and/or where the grating of the scale has a defect, the output signals of the light-receiving element 34 are brought into imbalance since the sizes of the stains and/or grating defects are varied and the measurement light irradiated onto the light-receiving element 34 is interrupted. As the output signals of the light-receiving element 34 are brought into imbalance, the direct current component of the Lissajous signal is offset from the normal position shown by a solid line in FIG. 2 to the position shown by a broken line, wherein there is a problem by which an error is brought about in the position detection based on the arctangent calculation.

SUMMARY OF THE INVENTION

The present invention was developed in view of solving the prior art problems, and it is therefore an object of the invention to reduce a position detection error resulting from stains on the scale and/or defects of the grating.

The present invention pertains to a photoelectric encoder including a scale having a grating of a predetermined pitch formed thereon and a detection head that is relatively displaceable with respect to the scale and is provided with a light source and a light-receiving unit, wherein light-receiving elements of the light-receiving unit are devised so as to output bright and dark signals of "N" phases (N is an integer of 3 or more), and the phases of the bright and dark signals of "N" phases are detected by fitting a sinusoidal wave function having a fixed period to digital signals of "N" phases, in which the bright and dark signals of "N" phases are digitalized, respectively. Accordingly, the invention solves the above-described problems.

Here, the light-receiving unit is such that "N" light-receiving elements are disposed in an array state at a fixed pitch, and bright and dark signals of the "N" phases can be output by sweeping the output of the respective light-receiving elements, in which incident measurement light is photoelectrically converted, by means of switching elements.

Also, the bright and dark signals of "N" phases, which are output from the light-receiving unit, can be analog-digitally converted, respectively, by an A/D conversion circuit after being noise filtered by a noise filter circuit.

In addition, the disposing pitch of the light-receiving elements may be made different from the pitch of the scale grating.

Further, the fitting may be carried out by the least-squares method.

Also, the fitting by the least-squares method may be carried out after the sinusoidaj wave function expressed by the following expression (i)

$$y = A\sin(x-B) + C \tag{i}$$

is substituted for the following expression (ii) by using a synthesis formula of a trigonometric function $$y = a\sin x + b\cos x + c \tag{ii}.$$

In addition, stains on the scale and/or defects of the grating may be detected by the bright and dark signals of "N" phases.

Further, when the amplitude of the sinusoidal wave function subjected to the fitting is smaller than a predetermined value, stains on the scale and/or defects of the grating may be detected.

Still further, portions where the scale is stained and/or the grating has a defect are eliminated from the objects of the fitting, and the fitting may be carried out again.

Also, where stains on the scale and/or defects of the grating excessively exist, it may be regarded as an accidental position detection error.

Where the detection head is located at a point where the scale is stained and/or the grating has a defect, the intensity of the bright and dark signals output from the light-receiving elements is partially lowered. However, according to the present invention, since there is almost no case where the light-receiving elements of the same phase are selectively interrupted as in the art of Patent Document 1, there is almost no case where the position detection becomes impossible, and the position can be continuously detected.

Furthermore, since no arctangent calculation is required, and an error is not brought about due to direct current offset of Lissajous signals as in principle, an error in the position detection is prevented from occurring even if the signals deteriorate due to stains.

In addition, it is possible to detect a point where the scale is stained and/or the grating has a defect and eliminate the point from the object of position detection.

Where stains on the scale and/or defects of the grating excessively exist, the amplitude of the sinusoidal wave function becomes near zero. Therefore, it is possible to detect an accidental position detection error by setting a predetermined threshold value in advance.

Further, since aliasing by which the detection pitch is out of order can be prevented from occurring by using a sinusoidal wave function having a fixed period, such an excellent effect and action can be brought about, by which the disposing pitch Pd of the light-receiving elements can be optically determined without depending on the pitch Ps of an incremental pattern of the scale.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein:

FIG. 11 is a view showing an example of a circuit for detecting a point where the scale is stained and/or the grating has a defect, and for outputting the error;

DETAILED DESCRIPTION OF THE PREFERRED EMBODIMENTS

Hereinafter, a detailed description is given of embodiments of the present invention with reference to the drawings.

Figure 1:
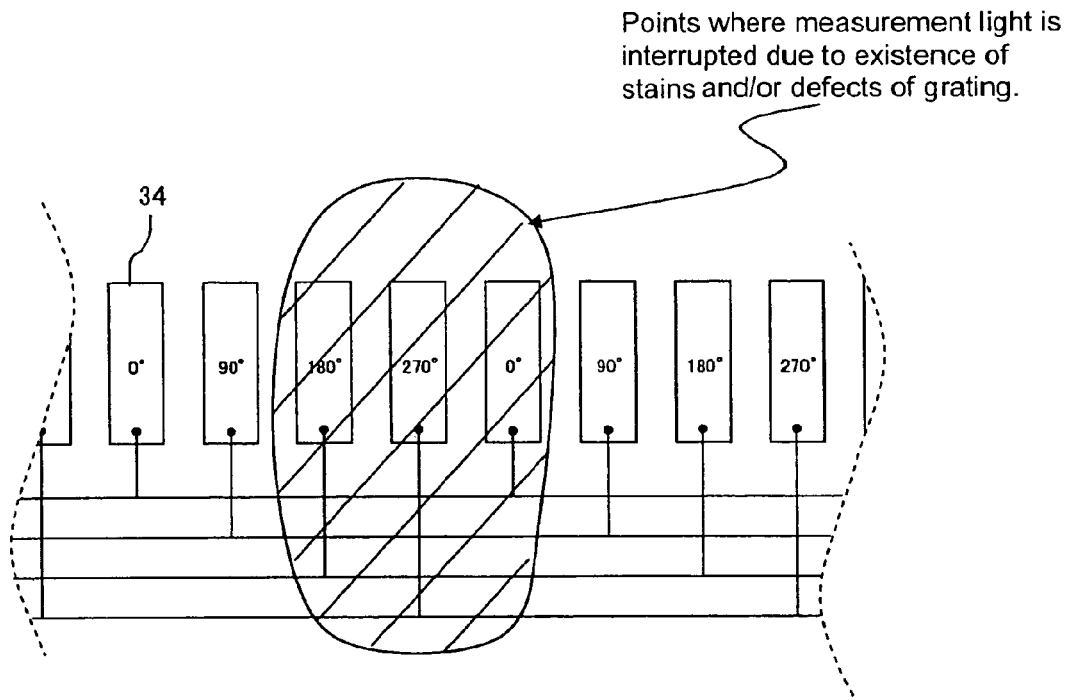
FIG. 1 is a plan view showing a state where measurement light is interrupted due to stains on a scale and/or defects of a grating.
Figure 2:
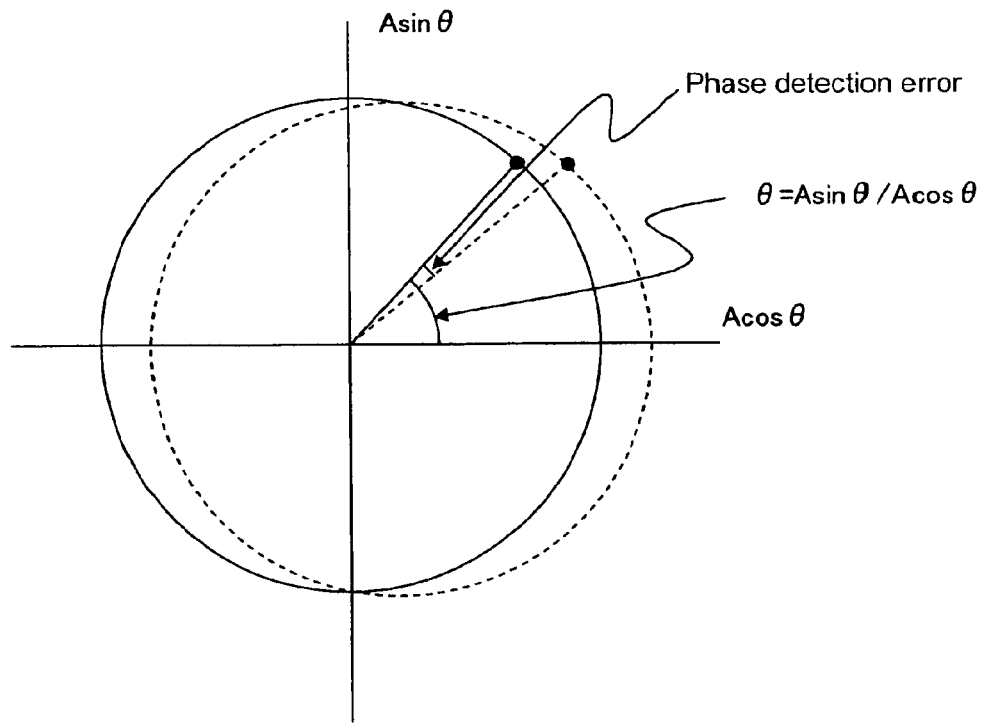
FIG. 2 is a view showing a change of Lissajous signals occurring in the case of FIG. 1.
Figure 3:
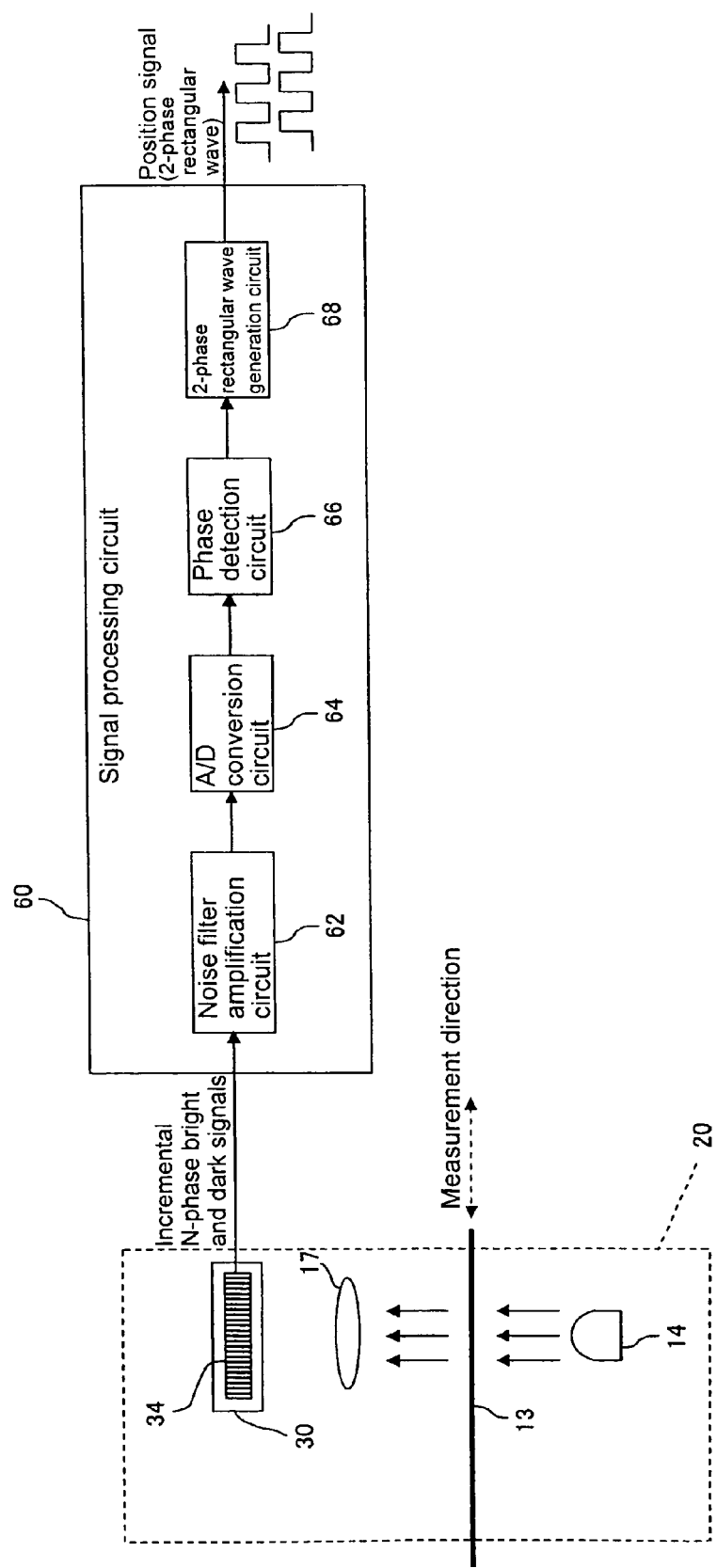
FIG. 3 is a view showing the entire configuration of an embodiment of the present invention.
Figure 4:
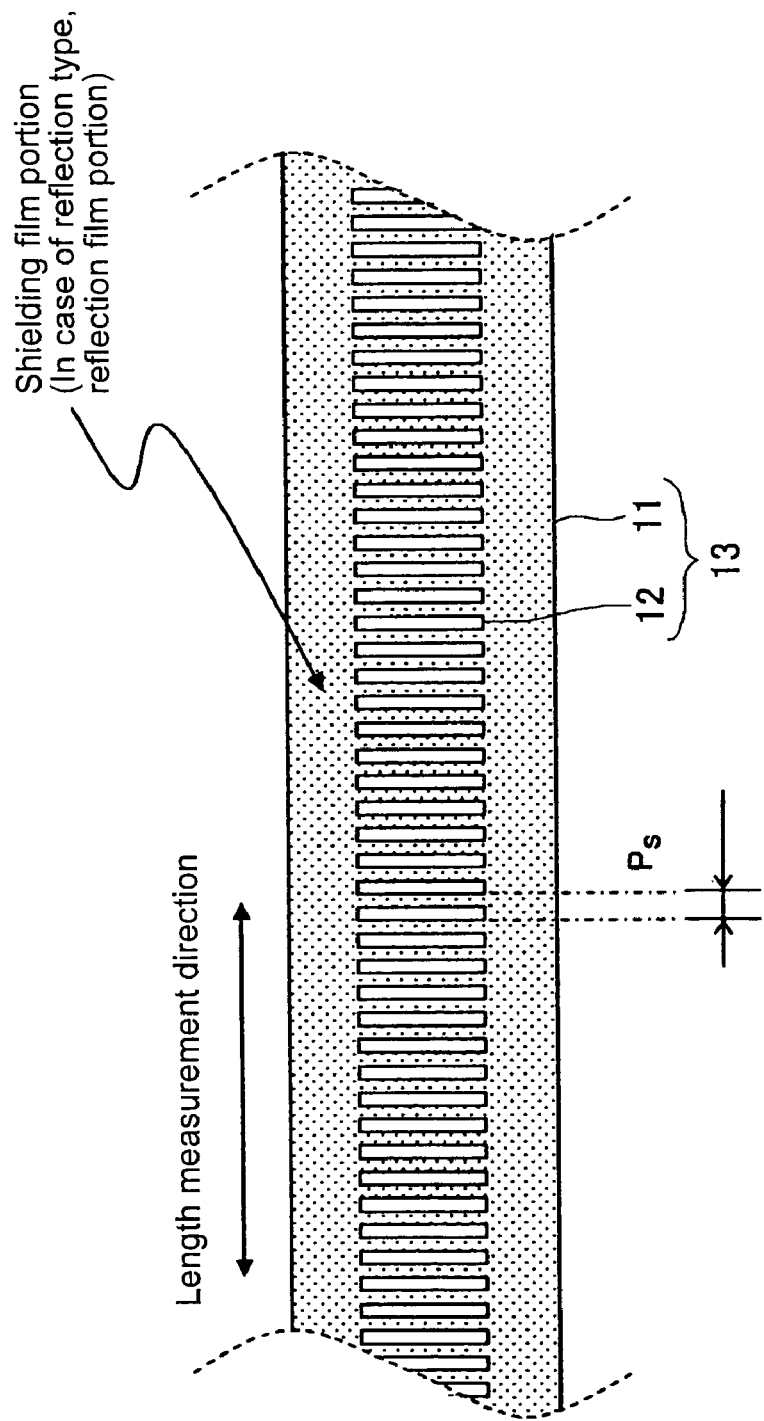
FIG. 4 is a plan view showing a configuration of the scale thereof.

The outline of the entire configuration of an embodiment of a photoelectric encoder according to the present invention is shown in FIG. 3. The photoelectric encoder is composed, as shown in FIG. 4, by being provided with a scale 13 having an incremental pattern of pitch Ps formed on a transparent glass substrate 11 as a grating 12, a detection head 20 having a light-emitting element 14 operating as a light source for irradiating measurement light, a collimator lens 17 for making the measurement light into parallel light and a light-receiving unit 30 incorporating light-receiving elements 34 in a array state, and a signal processing circuit 60 for processing output signals of the light-receiving elements 34 and outputting a position signal. Herein, the scale 13 is relatively movable in the length measurement direction with respect to the detection head 20 including the light-receiving element 14 and the light-receiving unit 30.

Figure 5:
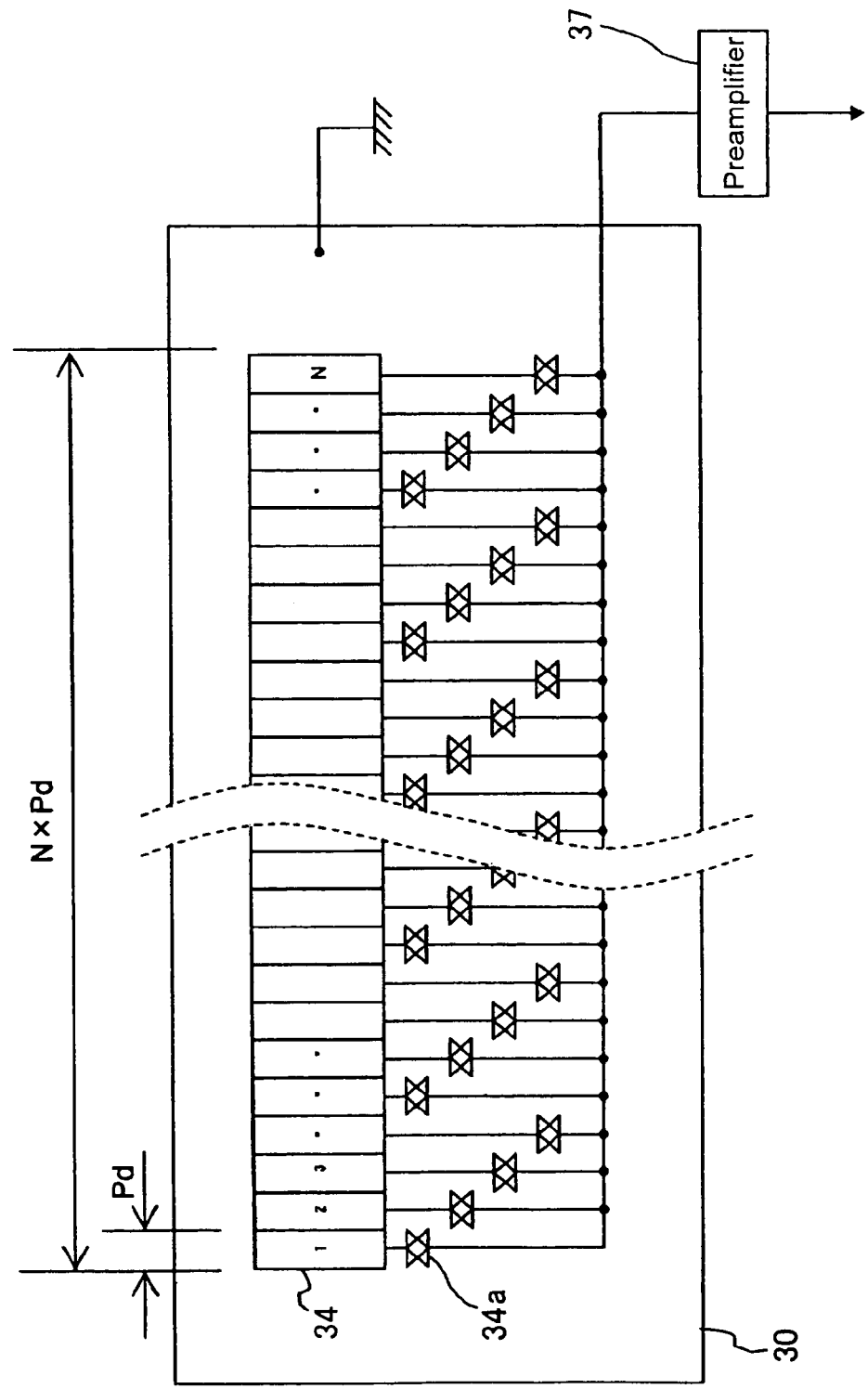
FIG. 5 is a plan view showing a configuration of a light-receiving unit thereof.

The light-receiving unit 30 is formed, as shown in FIG. 5, so that "N" light-receiving elements 34 are disposed in an array state at a fixed pitch Pd (N is an integer of 3 or more, for example, 1024 elements), and output bright and dark signals of "N" phases (for example, 1024 phases) via a preamplifier 37 by sweeping the output of the respective light-receiving elements 34, in which incident measurement light is photoelectrically converted, by means of switching elements 34a. In the case of an art of Patent Document 1, although it becomes impossible to detect the position if the light-receiving elements of the same phase selectively malfunction, in the case of the present invention, there is almost no case where it becomes impossible to detect the position because all the light-receiving elements equally function.

As shown in FIG. 3, the signal processing circuit 60 first noise filter input bright and dark signals of "N" phases by a noise filter circuit 62 and amplifies the same at a predetermined gain, and thereafter, analog-digitally converts the same, respectively, by an A/D conversion circuit 64. Continuously, after the phase of the scale 13 is detected by the phase detection circuit 66, the signal processing circuit 60 outputs 2-phase rectangular waves from a 2-phase rectangular wave generation circuit 68 to, for example, a counter circuit, etc., as a position signal.

Figure 6:
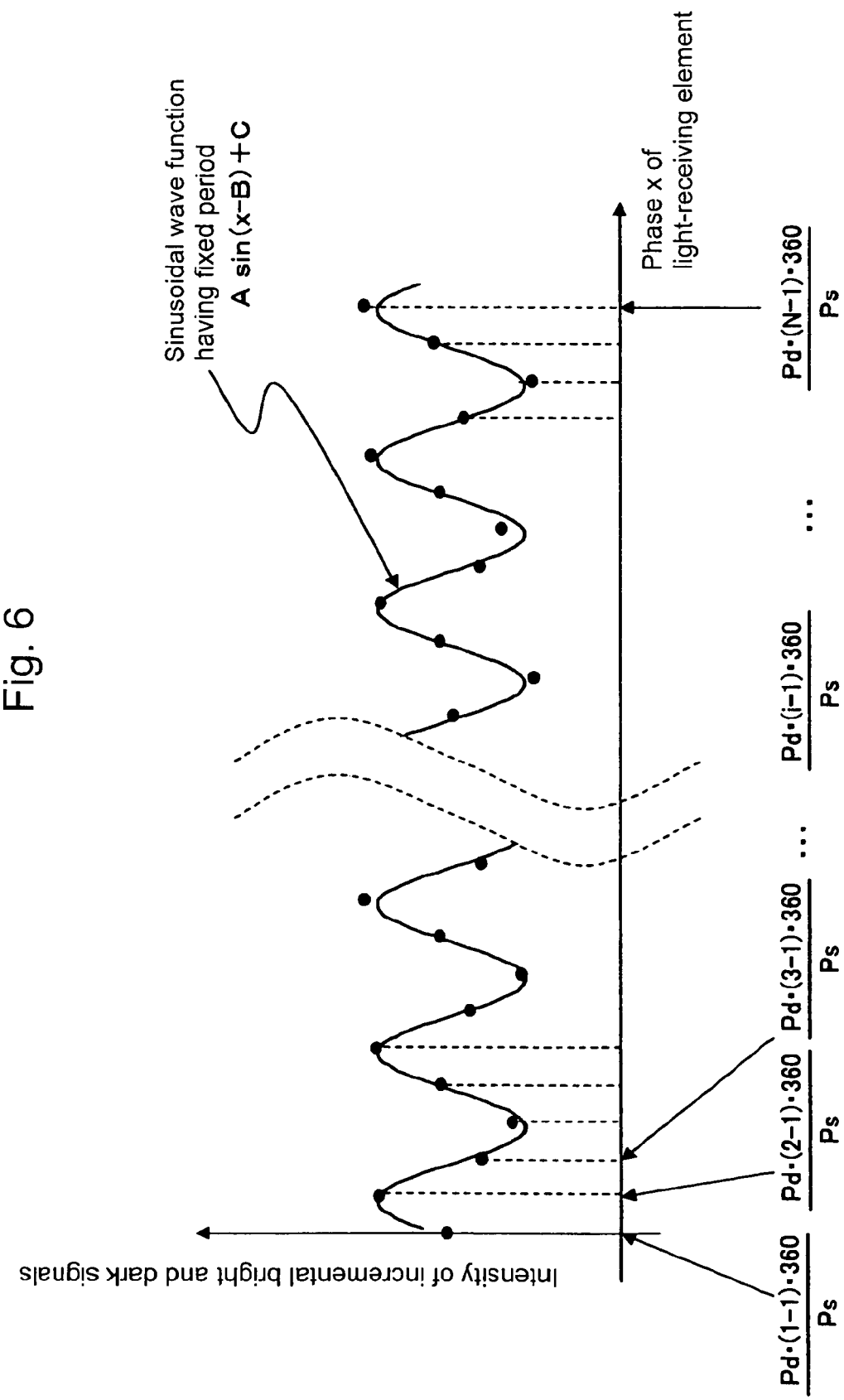
FIG. 6 is a view showing an example of a fitting state of a sinusoidal wave function in a normal state thereof.

A detailed description is further given of the function of the phase detection circuit 66 using FIG. 6. The phase detection circuit 66 detects the respective phases of bright and dark signals of "N" phases by carrying out a fitting process by the least-squares method, using a sinusoidal wave function $$A \sin(x-B)+C \tag{1}$$

having a fixed period as a model with respect to the digitalized bright and dark signals of "N" phases, respectively.

Here, description is given of the least-squares method of a sinusoidal wave function. To simplify, the abscissa shows the phases and the ordinate shows the intensity as shown in FIG. 7.

Figure 7:
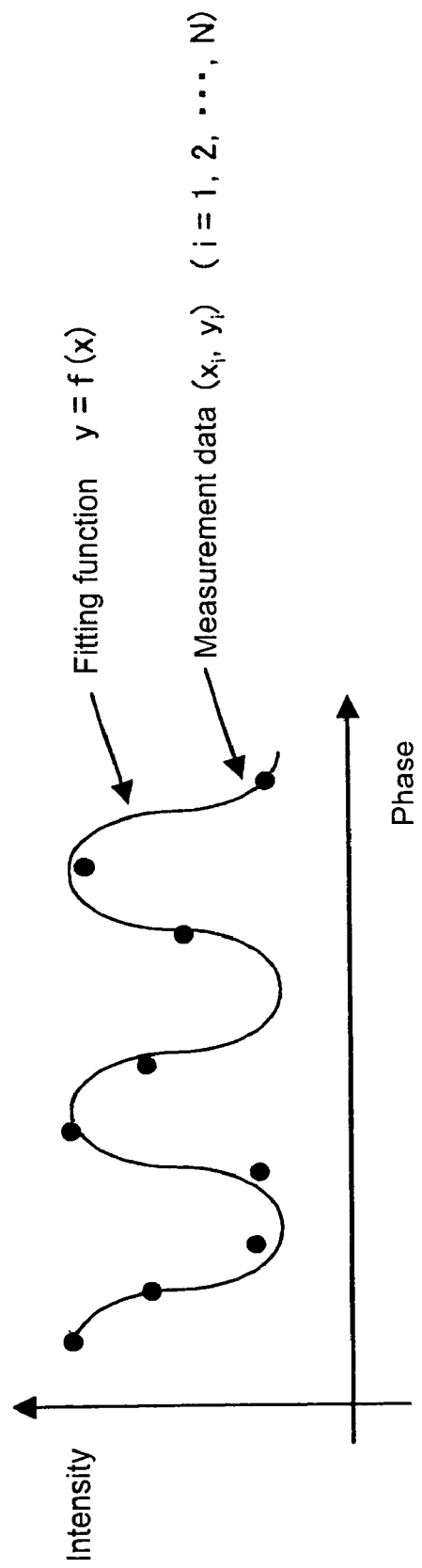
FIG. 7 is a view showing one example of measurement data and a fitting function.

First, as shown in FIG. 7, "N" pieces of data $(x_i, y_i)$ are made into the object subjected to the fitting, and the fitting function is made into $f(x)$.

A parameter value of $f(x)$ at which the following expression becomes the least from the definition of the least-squares method may be obtained.

$$\sum_{i=1}^{N} \{y_i - f(x_i)\}^2 \tag{2}$$

Here, where it is assumed that the parameter included in $f(x)$ is $Ak(k=1, 2, \ldots, M)$, if the expression (2) is brought into partial differentiation using Ak, the following expression is obtained because the expression is zero.

$$\frac{\partial \sum_{i=1}^{N} \{y_i - f(x_i)\}^2}{\partial A_k} = 0 \tag{3}$$

Since the equations are obtained equivalent to the number of the parameter M from the expression (3), Ak can be obtained by bringing the equations into simultaneous equation.

As for the general expression of the least-squares method, refer to Book [Fundamental Mathematics of Science and Technology, Numerical Calculation], Pages 52 through 54, (authored by Daisuke Takahashi).

Next, description is given of a case where the fitting function is a sinusoidal wave function shown by the following expression.

$$y = A \sin(x-B) + C \quad (4)$$

Since it becomes difficult to solve the simultaneous equation where the expression (4) is substituted into the expression (3), the expression (4) is substituted for the following expression using a synthesis formula of trigonometric function.

$$y = a \sin x + b \cos x + c \quad (5)$$

If the simultaneous equation is solved with the expression (5) substituted into the expression (3), a, b and c are obtained, and the parameters A, B and C in the expression (4) may be obtained by the synthesis formula of a trigonometric function as shown below.

$$A = \sqrt{(a^2+b^2)}, C = c$$

$$\sin(-B) = b/\sqrt{(a^2+b^2)}, \cos(-B) = a/\sqrt{(a^2+b^2)}$$

Further, where the parameter B is normally obtained, two solutions are brought about because arc sine and arc cosine are used. However, since cos B and sin B may be simultaneously obtained by this method, solving is possible by a single solution (the solution may be unambiguously obtained).

With the fitting process, the initial phase B of the sinusoidal wave function having a fixed period may be obtained. Since the initial phase B is equal to the phase of the scale 13, the scale position can be detected. Also, generally, the solution cannot be unambiguously obtained if the least-squares method is applied where the non-linear function is used as a model. However, where the period of the sinusoidal wave function is fixed, the solution can be unambiguously obtained exceptionally.

Figure 8:
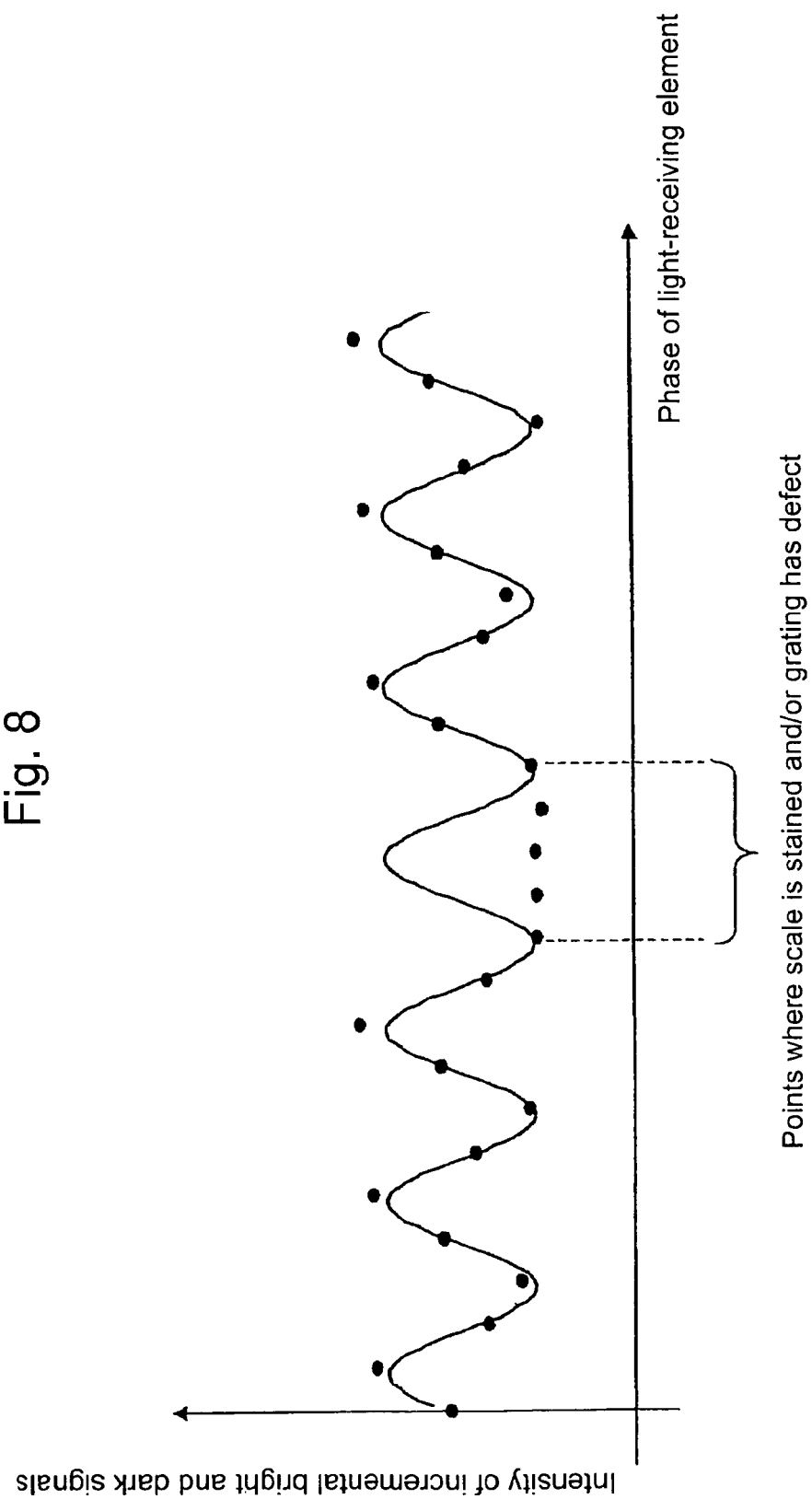
FIG. 8 is a view showing an example of a fitting state where the scale is stained and/or the grating has a defect in FIG. 6.

Description is given of a case where stains are adhered to the scale 13 and/or where the grating 12 of the scale has a defect, using FIG. 8. Although the intensity of the bright and dark signals output by the light-receiving elements 34 is lowered at points where stains and/or grating defects exist, there is no case where the light-receiving elements of the same phase are selectively interrupted. Further, since no arctangent calculation is required, and an error is not brought about due to direct current offset of Lissajous signals in principle, an error in position detection is prevented from occurring even if the signals deteriorate due to stains.

Figure 9:
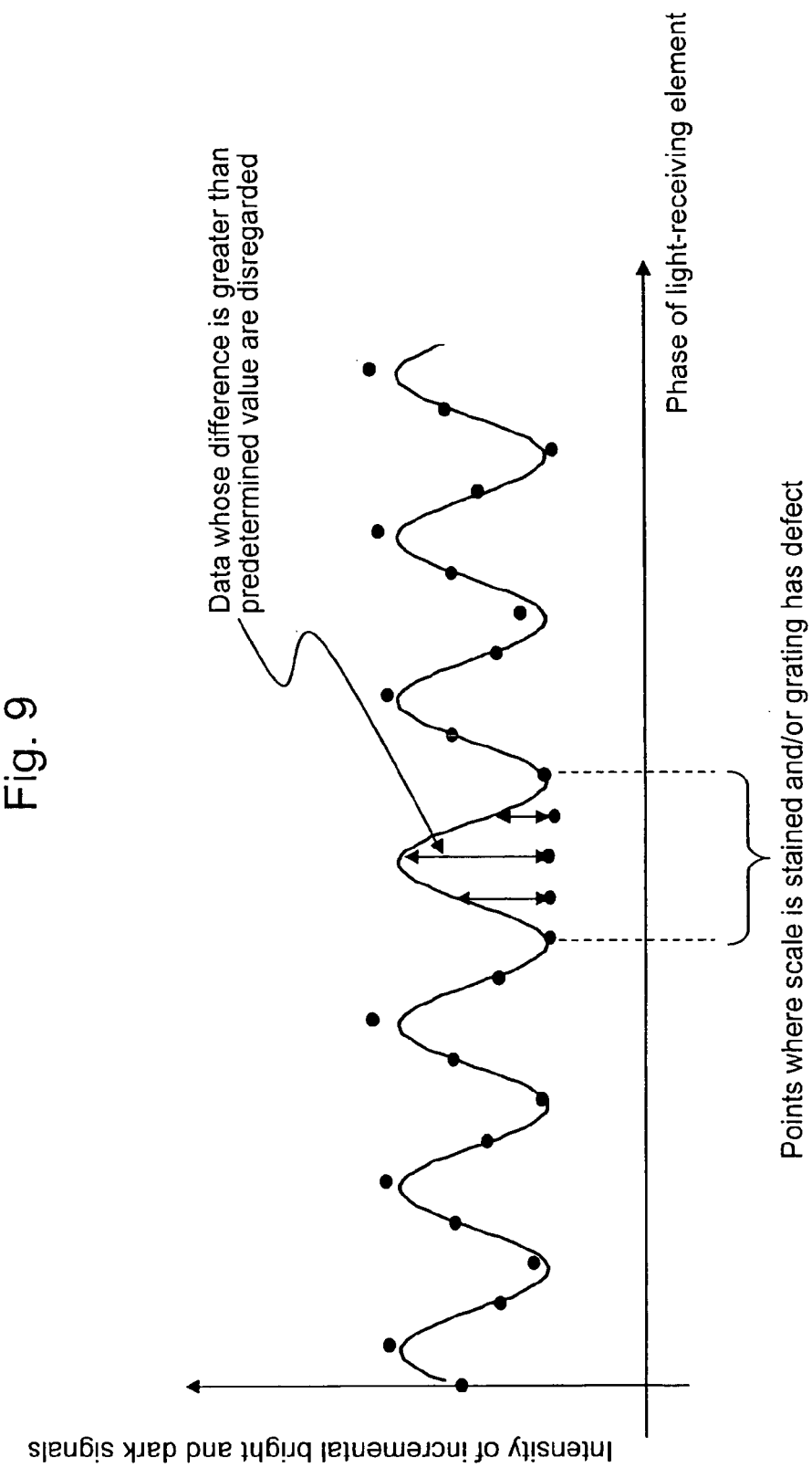
FIG. 9 is a view showing an example of disregarding data the difference of which is greater than a predetermined value thereof.

In addition, as shown in FIG. 9, if data having a greater difference than a predetermined value is disregarded when carrying out a fitting process, the data may also be eliminated from the objects for position detection.

Figure 10:
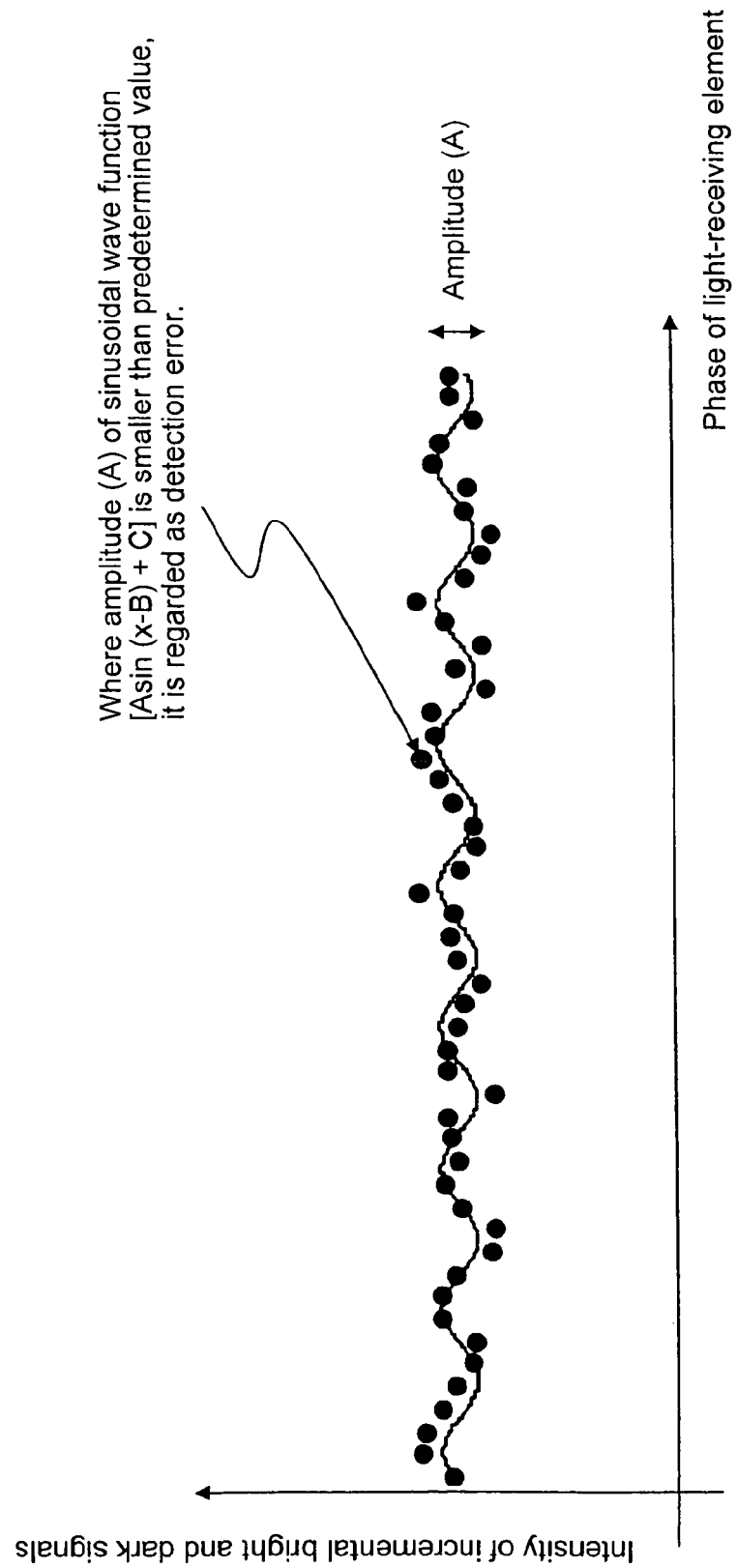
FIG. 10 is a view describing an accidental position detection error thereof.

Since the amplitude A of a sinusoidal wave function becomes near zero, as shown in FIG. 10, where stains on the scale 13 and/or defects of the grating 12 excessively exist, an accidental position detection error, or an incidental position detection error can be detected by setting a predetermined threshold value in advance. For example, detection of stains on the scale 13 and/or a defective point of the grating 12 can be output as an error. A method for outputting an error signal from the phase detection circuit 66 shown in FIG. 11(A) and a method for truing up the phases of rectangular waves output from the two-phase rectangular wave generation circuit 68 shown in FIG. 11(B) may be used as an example of outputting an error.

Figure 12:
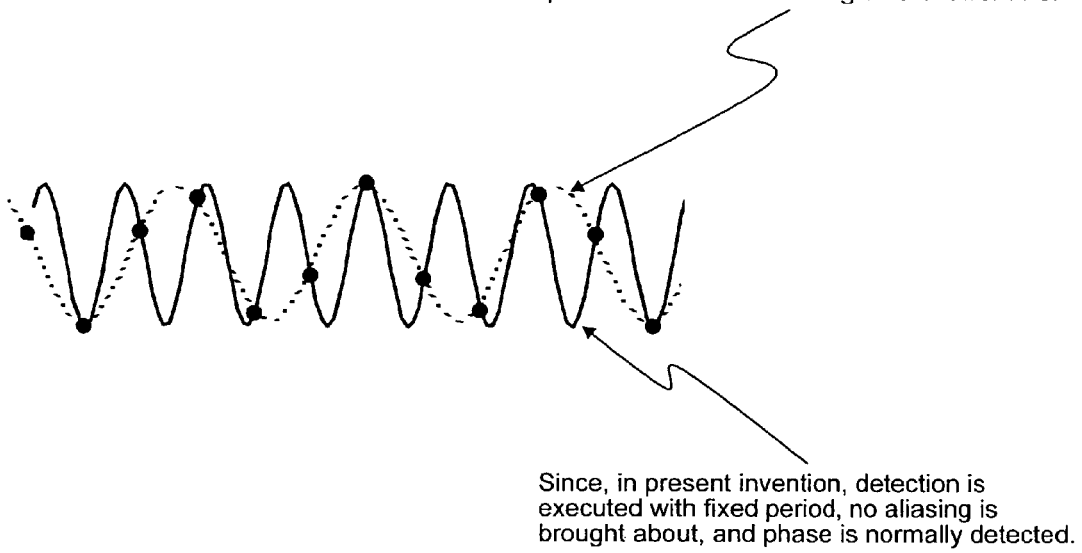
FIG. 12 is a view describing aliasing.

Also, since aliasing that detects a period different from the pitch (scale pitch) Ps of an incremental pattern of the scale 13 as shown by a broken line in FIG. 12 can be prevented from occurring, as shown by a solid line therein, by using a sinusoidal wave function having a fixed period, the disposing pitch of the light-receiving element (light-receiving element pitch) Pd may be optionally determined without depending on the scale pitch Ps, and the light-receiving element pitch Pd may also be made greater than the scale pitch Ps.

Figure 13:
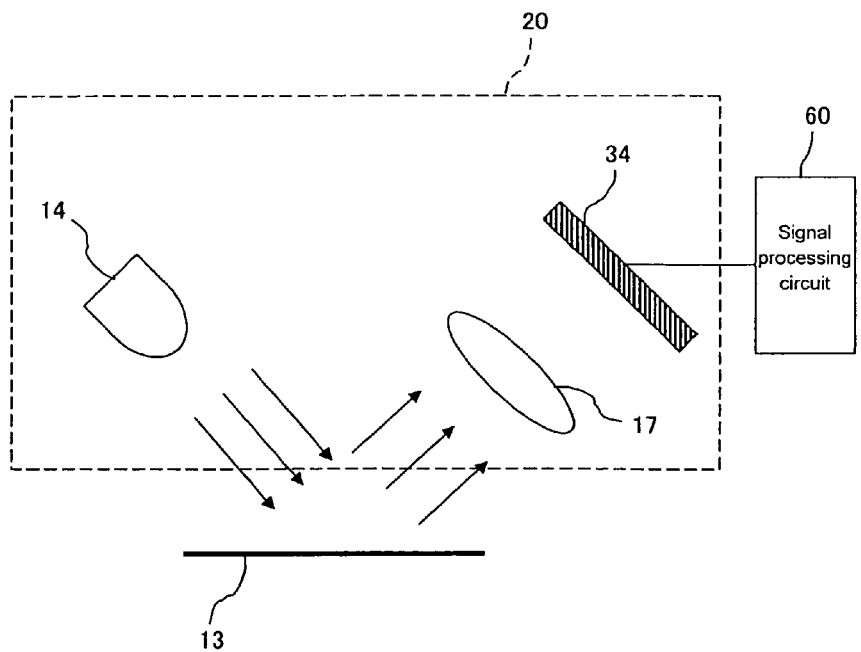
FIG. 13 is a view showing a configurational example of a reflection type photoelectric encoder to which the present invention is applicable.

Also, the present invention may be applicable to a reflection type photoelectric encoder as shown in FIG. 13.

The present invention may be further applicable to a rotary encoder as well as a linear encoder.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A photoelectric incremental encoder comprising:
a scale having a grating of an incremental pattern with a predetermined pitch Ps formed thereon; and
a detection head that is relatively displaceable with respect to the scale and is provided with a light source and a light-receiving unit,
wherein "N" light-receiving elements of the light-receiving unit are disposed in an array state at a fixed pitch Pd and devised so as to output bright and dark signals of "N" phases, "N" being an integer of 3 or more, and
the phases of the bright and dark signals of "N" phases are detected by fitting a sinusoidal wave function having a fixed period to digital signals of "N" phases, in which the bright and dark signals of "N" phases are digitalized, respectively.

2. The photoelectric incremental encoder according to claim 1, wherein the bright and dark signals of the "N" phases are output by sweeping the output of the respective light-receiving elements, in which incident measurement light is photoelectrically converted, by means of switching elements.

3. The photoelectric incremental encoder according to claim 2, wherein the disposing pitch of the light-receiving elements is different from the pitch of the scale grating.

4. The photoelectric incremental encoder according to claim 1, wherein the bright and dark signals of "N" phases, which are output from the light-receiving unit, are analog-digitally converted, respectively, by an A/D conversion circuit after being noise filtered by a noise filter circuit.

5. The photoelectric incremental encoder according to claim 4, wherein at least one of portions where the scale is stained or portions where the grating has a defect are eliminated from object of the fitting, and the fitting is carried out again.

6. The photoelectric incremental encoder according to claim 4, wherein where at least one of stains on the scale or defects of the grating excessively exist, it is regarded as an accidental position detection error.

7. The photoelectric incremental encoder according to claim 1, wherein the fitting is carried out by the least-squares method.

8. The photoelectric incremental encoder according to claim 7, wherein the fitting by the least-squares method is carried out after a sinusoidal wave function expressed by following expression (i)

$$y = A \sin(x-B) + C \quad (i)$$

is substituted for following expression (ii) by using a synthesis formula of a trigonometric function $$y = a \sin x + b \cos x + c \qquad \text{(ii).}$$

9. The photoelectric incremental encoder according to claim 1, wherein at least one of stains on the scale or defects of the grating are detected by the bright and dark signals of "N" phases.

10. The photoelectric incremental encoder according to claim 9, wherein when the amplitude of the sinusoidal wave function subjected to the fitting is smaller than a predetermined value, the at least one of the stains on the scale or the defects of the grating are detected.

* * * * *